US006940589B1

(12) United States Patent
Suyama et al.

(10) Patent No.: US 6,940,589 B1
(45) Date of Patent: Sep. 6, 2005

(54) OPTICAL MEASUREMENT APPARATUS AND METHOD FOR OPTICAL MEASUREMENT

(75) Inventors: Motohiro Suyama, Hamamatsu (JP); Yoshihiko Kawai, Hamamatsu (JP); Tetsuya Morita, Hamamatsu (JP); Koichiro Oba, Hamamatsu (JP)

(73) Assignee: Hamamatsu Photonics K.K., Hamamatsu (JP)

( * ) Notice: Subject to any disclaimer, the term of this patent is extended or adjusted under 35 U.S.C. 154(b) by 67 days.

(21) Appl. No.: 10/381,370

(22) PCT Filed: Sep. 25, 2000

(86) PCT No.: PCT/JP00/06562
  § 371 (c)(1),
  (2), (4) Date: Mar. 25, 2003

(87) PCT Pub. No.: WO02/27284
  PCT Pub. Date: Apr. 4, 2002

(51) Int. Cl.[7] .............................. G01J 7/00; G01T 1/24
(52) U.S. Cl. .............. 356/213; 250/370.06; 250/214.1; 250/214 VT
(58) Field of Search ........................ 356/213, 222–224, 356/229; 250/370.01, 370.06, 370.13, 207, 250/214 VT, 214.1, 214 R, 227.11, 208.1, 250/234–235, 306–307

(56) References Cited

U.S. PATENT DOCUMENTS 5,349,193 A * 9/1994 Mott et al. ............. 250/370.06
5,654,536 A * 8/1997 Suyama et al. ............. 250/207
5,854,489 A * 12/1998 Verger et al. .......... 250/370.06
6,189,221 B1 * 2/2001 Barrow et al. ................ 30/417

FOREIGN PATENT DOCUMENTS

| JP | A 63-184073 | 7/1988 |
| JP | A 6-318447 | 11/1994 |
| JP | A 8-148113 | 6/1996 |
| JP | A 9-189604 | 7/1997 |
| JP | A 9-196752 | 7/1997 |

(Continued)

OTHER PUBLICATIONS

U.S. Appl. No. 10/381,368, filed Mar. 25, 2001, Suyama et al.

(Continued)

Primary Examiner—Gregory J. Toatley, Jr.
Assistant Examiner—Sang H. Nguyen
(74) Attorney, Agent, or Firm—Oliff & Berridge PLC

(57) ABSTRACT

An optical measurement apparatus 10 primarily includes: a photon detection unit 12 for detecting incident photons, a time signal output unit 14 for outputting a time signal, and a storage unit 16 for storing the time signal outputted from the time signal output unit 14 when the photon detection unit 12 detects photons. The photon detection unit 12 includes a HPD 24 having a photocathode 24a and an APD 24b, a TZ amplifier 26, a peak holding circuit 28, and an A/D converter 30. The time signal output unit 14 includes a timer 32 and a counter 34. The storage unit 16 includes a comparator 36 and a memory 38. When photons impinge on the HPD 24, a trigger signal is outputted from the comparator 36, causing the photon-number outputted from the A/D converter 30 and the time data outputted from the counter 34 to be stored in the memory 38.

20 Claims, 9 Drawing Sheets

| | FOREIGN PATENT DOCUMENTS | |
|---|---|---|
| JP | A 9-297055 | 11/1997 |
| JP | A 9-312145 | 12/1997 |
| JP | A 11-37850 | 2/1999 |
| JP | A 11-37851 | 2/1999 |
| JP | A 2000-275101 | 10/2000 |

OTHER PUBLICATIONS

M.D. Petroff et al., "Photon-Counting Solid-State Photomultiplier", IEEE Transactions on Nuclear Science, vol. 36, No. 1 Feb. 1989, pp. 158-162.

* cited by examiner

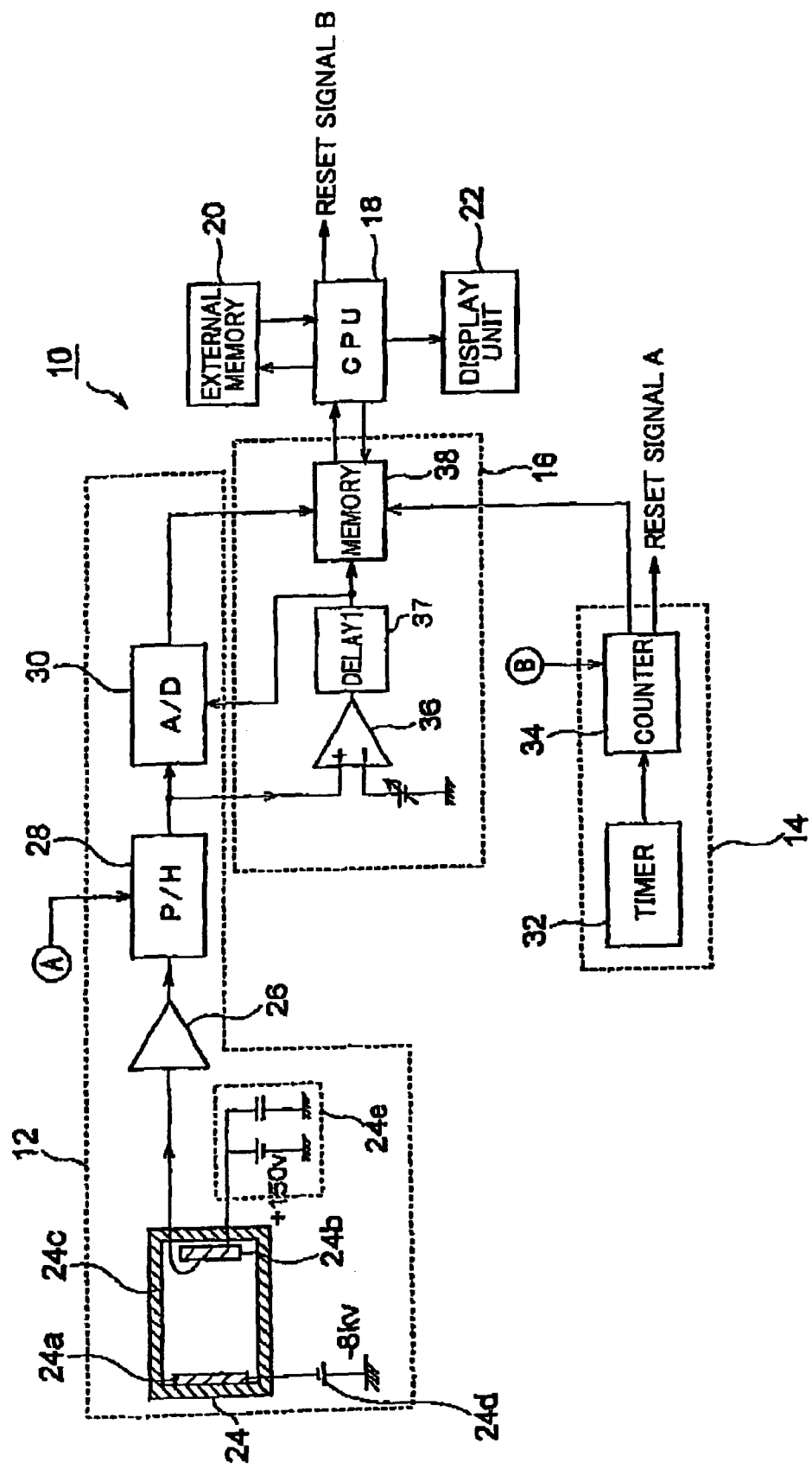

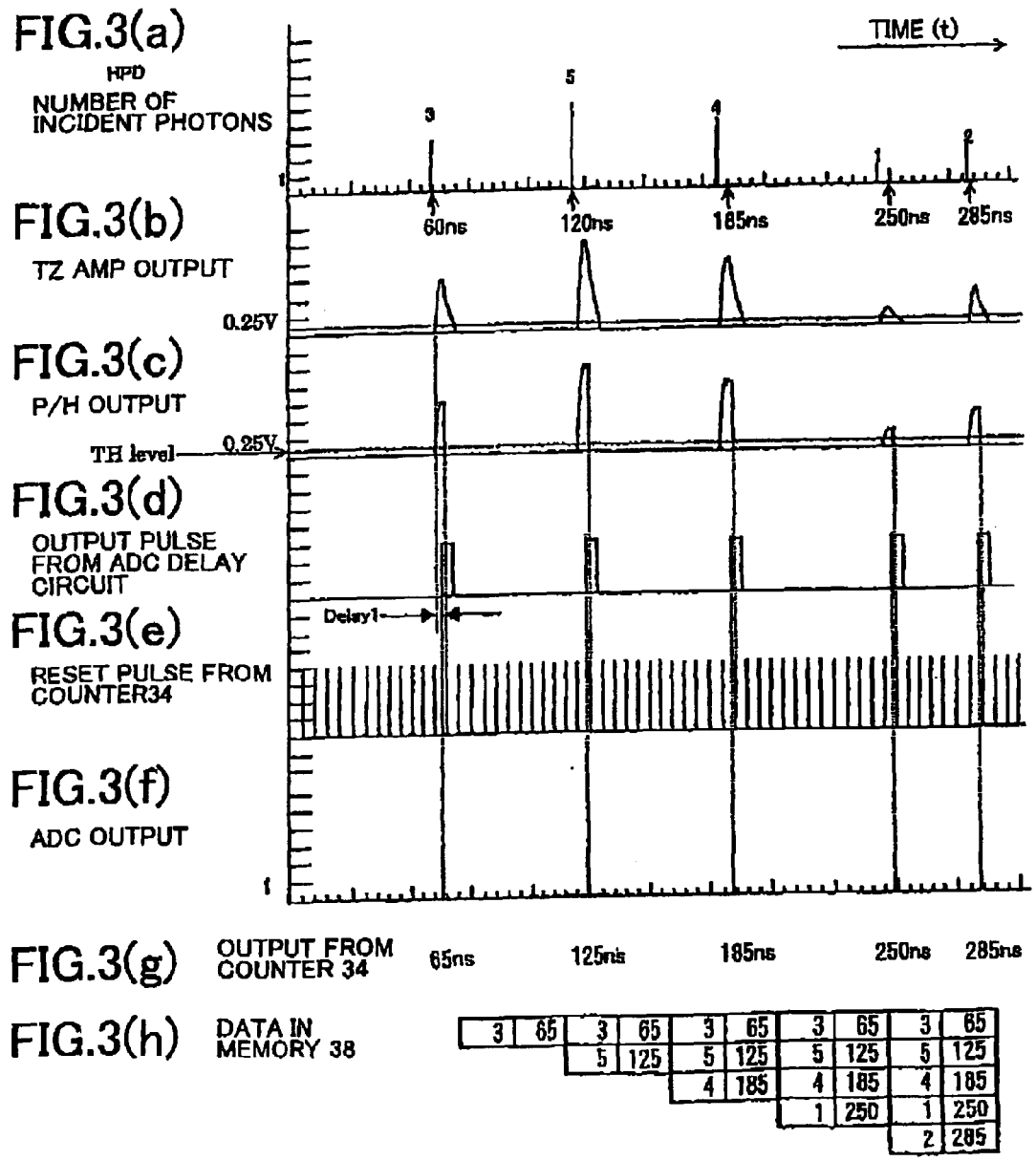

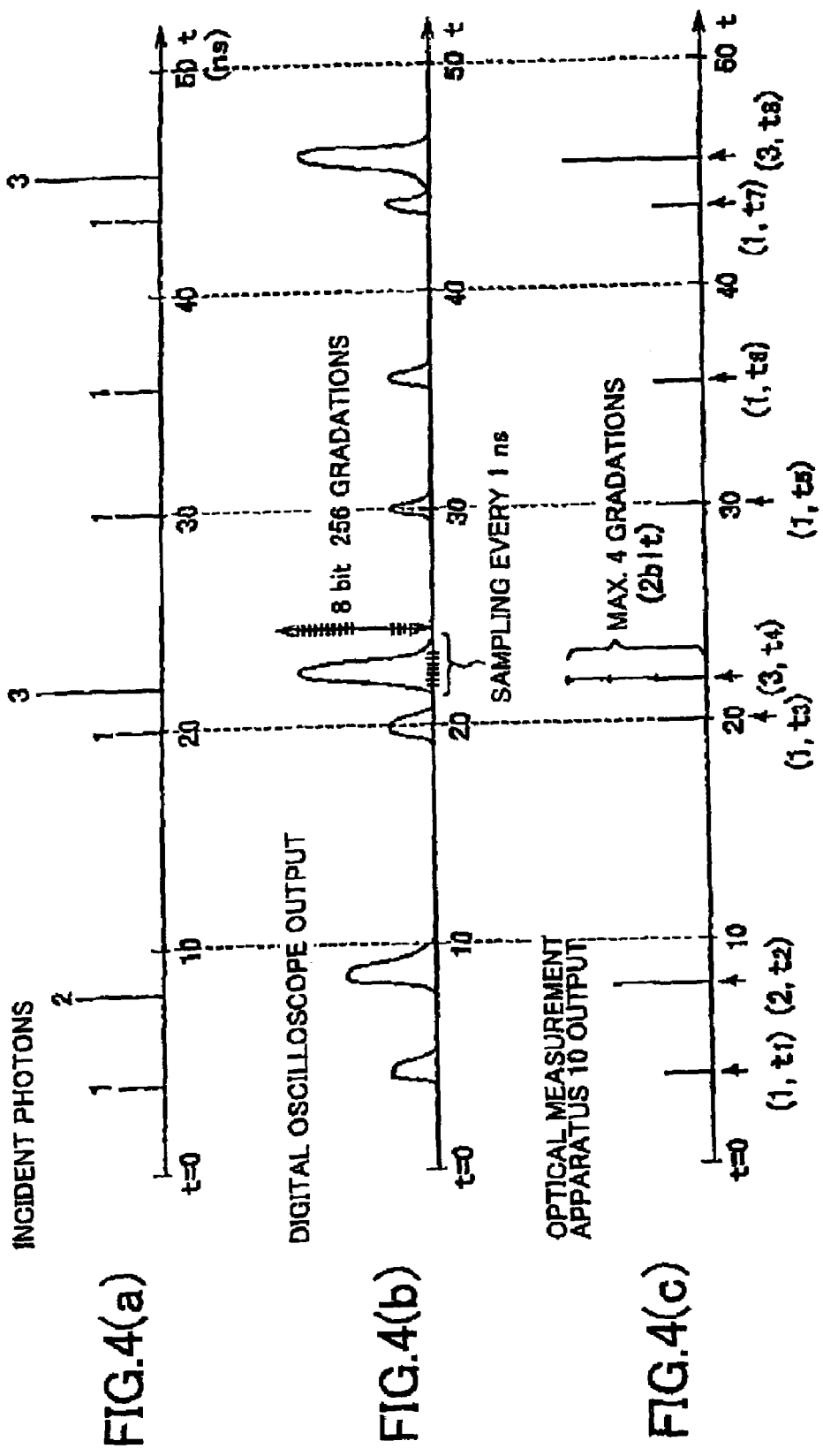

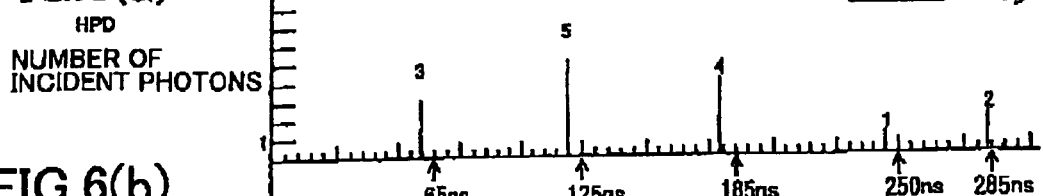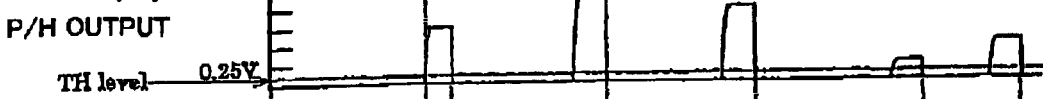

OPTICAL MEASUREMENT APPARATUS AND METHOD FOR OPTICAL MEASUREMENT

TECHNICAL FIELD

The present invention relates to an optical measurement apparatus and a method for optical measurement, and particularly to an optical measurement apparatus and method for optical measurement for detecting photons.

BACKGROUND ART

Accompanying the development of optical technology in recent years, light has come to be used in such fields as optical communications, optical sensing, and optical computers, and there is no doubt that these fields of use will continue to expand in the future. Under these conditions, the measurement of light has become extremely important. Tools used for measuring light, such as photomultiplier tubes and the like, are well known in the art. By using the photomultiplying effect of photomultiplier tubes, it is possible to detect weak light with great efficiency.

However, in order to expand the new fields for using optics in the future, it will be extremely important to measure light at the photon level in time and space, as in "when and how many photons have arrived." The conventional tool (method), such as a photomultiplier tube, for measuring light is not a tool for measuring light in time and space at the photon level.

DISCLOSURE OF THE INVENTION

Use of a digital oscilloscope, for example, to observe output from an avalanche photodiode, which is capable of detecting light at the photon level, is a conceivable method for measuring light in time and space at the photon level. However, because the oscilloscope is not designed for detecting photons, the digital oscilloscope has a higher resolution than necessary. Accordingly, as a tradeoff for the high resolution, the oscilloscope is drastically limited in the length of time that the oscilloscope can perform measurements.

The present invention is to solve the above-described problems. It is an objective of the present invention to provide an optical measurement apparatus and a method for optical measurement capable of measuring "when photons arrive" or "how many photons have arrived" over a long period of time.

In order to overcome the above-described problem, the present invention provides an optical measurement apparatus, comprising: a photon detecting portion detecting incident photons; a time signal outputting portion outputting time signals; and a storing portion storing a time signal that is outputted from the time signal outputting portion at the time when the photon detecting portion detects photons, wherein the photon detecting portion includes: a photodetector outputting an output signal in response to incidence of photons; and a peak holding circuit detecting the output signal supplied from the photodetector and holding a peak thereof, wherein the storing portion includes: a comparing portion comparing the output signal detected by the peak holding circuit with a predetermined threshold value and outputting a trigger signal when a predetermined delay time has elapsed after the output signal has become larger than the threshold value; and a storage controlling portion storing the time signal upon receipt of the trigger signal.

The optical measurement apparatus can measure when photons have arrived by storing a time signal that is outputted from the time signal outputting portion when the photon detecting portion detects photons. On the other hand, no data is stored in the storing portion when the photon detecting portion does not detect photons. Accordingly, the amount of data stored in the storing portion is extremely small. As a result, the optical measurement apparatus can measure, over a long period of time, when photons have arrived.

It is preferable that the photodetector in the photon detecting portion detects the number of incident photons, and wherein the storing portion stores, when the photon detecting portion detects photons, both the number of photons detected by the photon detecting portion and the time signal outputted by the time signal outputting portion and outputs an output signal that corresponds to the number of incident photons, wherein the peak holding circuit detects the output signal supplied from the photodetector and holds the peak thereof, wherein the storage controlling portion stores the time signal and a value of the peak held in the peak holding circuit upon receipt of the trigger signal.

The optical measurement apparatus can measure when and how many photons have arrived by storing, when the photon detecting portion detects photons, the number of the photons detected by the photon detecting portion and a time signal that is outputted from the time signal outputting portion when the photon detecting portion detects photons. On the other hand, no data is stored in the storing portion when the photon detecting portion does not detect photons. Accordingly, the amount of data stored in the storing portion is extremely small. As a result, the optical measurement apparatus can measure over a long period of time when and how many photons have arrived.

It is preferable that the photon detecting portion further includes an analog-to-digital converter converting the value of the peak held in the peak holding circuit from analog to digital, wherein the storage controlling portion controls, in response to the trigger signal, the analog-to-digital converter to convert the value of the peak held in the peak holding circuit from analog to digital, thereby outputting the number of incident photons in a digital value.

By outputting the number of incident photons as a digital value, the signal outputted from the photon detecting portion can be directly stored in the staring portion.

It is preferable that the photon detecting portion includes: a photocathode emitting photoelectrons that correspond to the number of the incident photons; an accelerating portion accelerating the photoelectrons emitted from the photocathode; and a semiconductor photodetector receiving the photoelectrons accelerated by the accelerating portion and outputting an output signal that corresponds to the number of the photoelectrons.

By using the photon detecting portion that is provided with the photocathode, the accelerating portion, and the semiconductor photodetector, it is possible to efficiently detect the number of photons that fall incident simultaneously (or at nearly the same timings).

It is preferable that the semiconductor photodetector includes an avalanche photodiode.

In order to overcome the above-described problem, the present invention provides an optical measurement method, comprising: a photon detecting step detecting incident photons; a time signal outputting step outputting time signals; and a storing step storing a time signal that is outputted from the time signal outputting step at the time when the photon detecting step detects photons, wherein the photon detecting step includes: a photodetecting step outputting an output signal in response to incidence of photons; and a peak holding step detecting the output signal supplied from the photodetecting step and holding a peak thereof, wherein the storing step includes: a comparing step comparing the output signal detected by the peak holding step with a predetermined threshold value and outputting a trigger signal when a predetermined delay time has elapsed after the output signal has become larger than the threshold value; and a storage controlling step storing the time signal upon receipt of the trigger signal.

The optical measurement method can measure when photons have arrived by storing a time signal that is outputted at the time signal outputting step when the photon detecting step detects photons. On the other hand, no data is stored by the storing step when the photon detecting step does not detect photons. Accordingly, the amount of data stored by the storing step is extremely small.

It is preferable that the photodetecting step in the photon detecting step detects a plurality of incident photons in separation from one another, and outputs an output signal that corresponds to the number of the incident photons, wherein the peak holding step detects the output signal supplied from the photodetecting step and holds the peak thereof, wherein the storage controlling step stores the time signal and a value of the peak held by the peak holding step upon receipt of the trigger signal.

The optical measurement method can measure when and how many photons have arrived by storing, when the photon detecting step detects photons, the number of the photons detected by the photon detecting step and a time signal that is outputted at the time signal outputting step when the photon detecting step detects photons. On the other hand, no data is stored by the storing step when the photon detecting step does not detect photons. Accordingly, the amount of data stored by the storing step is extremely small. As a result, the optical measurement method can measure over a long period of time when and how many photons have arrived.

BRIEF DESCRIPTION OF THE DRAWINGS

In the drawings;

FIG. 1 shows the construction of an optical measurement apparatus according to a preferred embodiment of the present invention;

FIGS. 3(a)–3(h) are timing charts showing the operations of the optical measurement apparatus in FIG. 1; wherein FIG. 3(a) shows the impinging timing of photons; FIG. 3(b) shows the output from a TZ amplifier; FIG. 3(c) shows the output from a peak holding circuit; FIG. 3(d) shows the trigger signal outputted from an A/D conversion delay circuit 37; FIG. 3(e) shows the reset signal outputted from a counter; FIG. 3(f) shows the output from the A/D converter; FIG. 3(g) shows the output from the counter; and FIG. 3(h) shows the data in memory;

FIGS. 4(a)–4(c) are timing charts comparing the effects of the optical measurement apparatus in FIG. 1 to a comparative example; wherein FIG. 4(a) shows the impinging timing of photons; FIG. 4(b) shows the output from a digital oscilloscope used for comparison; and FIG. 4(c) shows the output from the optical measurement apparatus 10.

FIGS. 6(a)–6(h) are timing charts showing the operations of the optical measurement apparatus in FIG. 5; wherein FIG. 6(a) shows the impinging timing of photons; FIG. 6(b) shows the output from the TZ amplifier; FIG. 6(c) shows the output from the peak holding circuit; FIG. 6(d) shows the trigger signal outputted from the A/D conversion delay circuit 37; FIG. 6(e) shows a reset signal outputted from a delay circuit 29; FIG. 6(f) shows the output from the A/D converter; FIG. 6(g) shows the output from the counter; and FIG. 6(h) shows the data in memory;

FIGS. 8(a)–8(h) are timing charts showing the operations of the optical measurement apparatus in FIG. 7; wherein FIG. 8(a) shows the impinging timing of photons; FIG. 8(b) shows the read signal outputted from the counter; FIG. 8(c) shows the reset signal outputted from the counter; FIG. 8(d) shows the output from a charge amplifier; FIG. 8(e) shows the trigger signal outputted from the comparator 36; FIG. 8(f) shows the output from the A/D converter; FIG. 8(g) shows the output from the counter; and FIG. 8(h) shows the data in memory.

BEST MODE FOR CARRYING OUT THE INVENTION

Figure 2A:
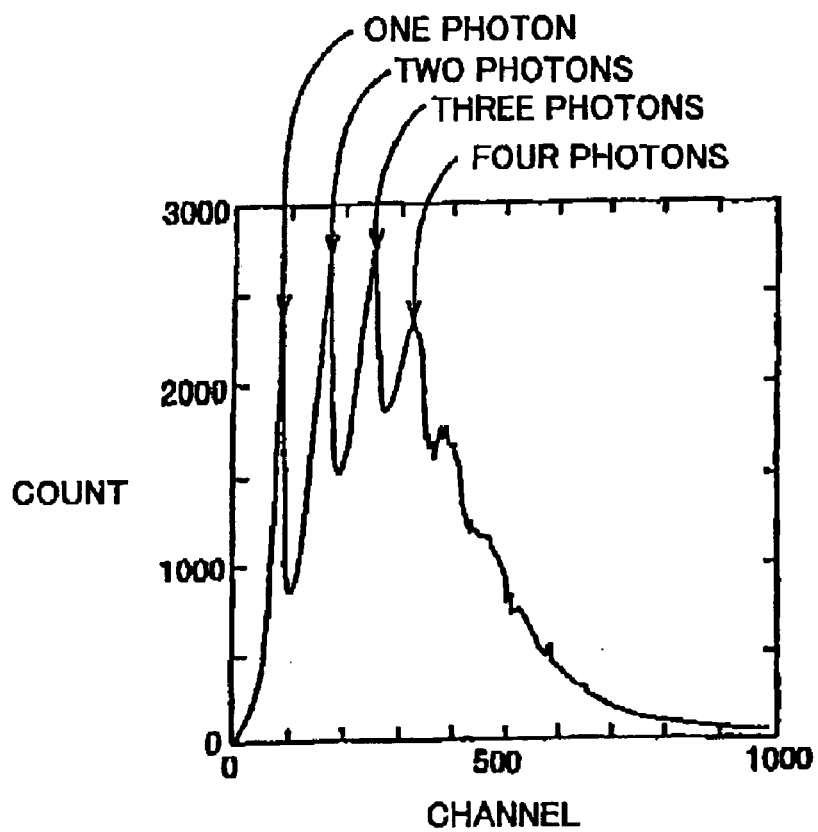
FIG. 2(a) shows the wave height distribution of outputs an the HPD 24 in response to multiple incident photons.

An optical measurement apparatus and method for optical measurement according to a preferred embodiment of the present invention will be described with reference to FIGS. 1–4(c).

First the construction of the optical measurement apparatus according to the preferred embodiment will be described. FIG. 1 shows the construction of this optical measurement apparatus.

An optical measurement apparatus 10 according to the preferred embodiment includes a photon detection unit 12 for detecting incident photons, a time signal output unit 14 for outputting a time signal, a storage unit 16 for storing time signals outputted from the time signal output unit 14 when the photon detection unit 12 detects photons, a CPU 18 for controlling overall operations of the device, an external memory 20 for storing settings and the like, and a display unit 22 for displaying measurement results and the like. Next, each component of the optical measurement apparatus 10 will be described in more detail.

The photon detection unit 12 includes a hybrid photodetector (hereinafter referred to as the HPD 24), a transimpedance amplifier (hereinafter referred to as the TZ amplifier 26), a peak holding circuit 28, and an A/D (analog-to-digital) converter 30.

The HPD 24 is an electron tube having a photocathode 24a for emitting photoelectrons corresponding to the number of incident photons and an avalanche photodiode (hereinafter referred to as an APD 24b), which is a semiconductor photodetector for outputting an output signal corresponding to the number of photoelectrons emitted from the photocathode 24a. The photocathode 24a and APD 24b are disposed opposing each other in a vacuum chamber 24c. A high-voltage source 24d applies a high negative voltage (for example, −8 kV) to the photocathode 24a, while a bias circuit 24e applies a reverse bias voltage (for example, −150 V) across an anode and a cathode of the APD 24b. An electronic lens unit not shown in the diagram is also provided in the HPD 24, enabling the photoelectrons emitted from the photocathode 24a to be efficiently impinged on the APD 24b.

When photons impinge on the photocathode 24a, photoelectrons corresponding to the number of the incident photons are emitted from the photocathode 24a. These photoelectrons are accelerated by the work of an electric field, converged by the electronic lens unit, and impinged on the APD 24b. When the photoelectrons enter the APD 24b, numerous hole-electron pairs are generated when they lose energy. This determines the multiplication factor of the first stage. The multiplication factor of the first stage is dependent on the acceleration voltage of the electrons (the voltage applied to the photocathode), and is approximately 1,200 when the voltage is −8 kV. The electrons are further amplified through avalanche multiplication to about 50 times, resulting in a gain of approximately 60,000 times through the effects of the entire APD 24b. Since the multiplication factor of approximately 1,200 in the first stage is extremely large, the multiplication fluctuations in the HPD 24 that uses the APD 24b are extremely small. Accordingly, the distribution of outputted wave heights shown in FIG. 2(a) are obtained from the HPD 24 when the HPD 24 receives multiple photons. With this HPD 24, it is possible to detect how many photons fall incident thereon. The results shown in FIG. 2(a) were obtained when applying a voltage of −8 kV to the photocathode 24a and a reverse bias voltage of −150 V to the APD 24b and conducting measurements using an Oltec model no. 142A preamplifier.

Since the gain of the HPD 24 is about 60,000 and the full-width half-maximum (FWHM) of the output waveform from the HPD 24 corresponding to one electron is about 2 ns, the peak current outputted from the HPD 24 is about 5 $\mu$A per photon. (The photon-electron conversion efficiency is set to 100% for convenience.)

As the HPD 24, the electron tubes disclosed in Japanese unexamined patent application publications Nos. HEI-9-312145 and HEI-6-318447, a photomultiplier tube disclosed in Japanese unexamined patent application publication No. HEI-8-148113, and an electron tube disclosed in Japanese unexamined patent application publication No. HEI-9-297055 can be widely used.

Figure 2B:
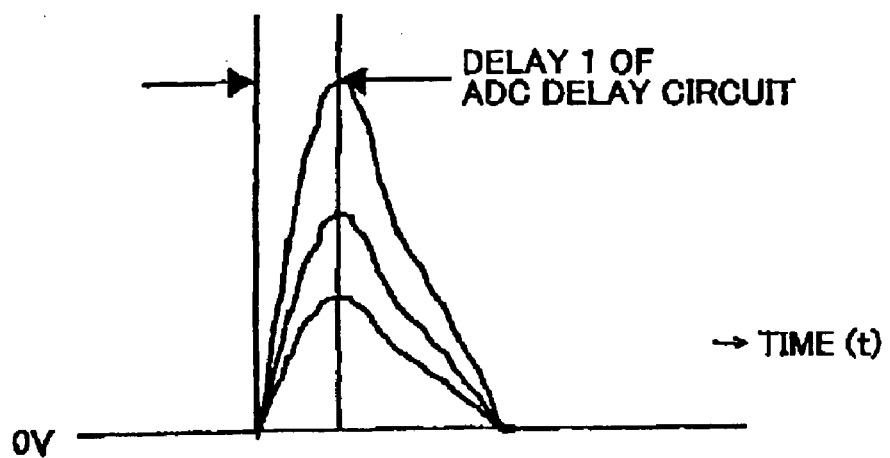
FIG. 2(b) shows the waveform of a signal output from the TZ amplifier 26.

The TZ amplifier 26 is a current-to-voltage converting circuit that amplifies the current signal outputted from the APD 24b, that converts the signal to a voltage, and that outputs the voltage. The output waveform of the TZ amplifier 26 is shown in FIG. 2(b). The time required for the voltage to rise from 0 V to the maximum voltage is fixed and not dependent on the magnitude of the input signal. The TZ amplifier 26 preferably has a gain for amplifying 1 $\mu$A to about 50 mV and should have a bandwidth of about 300 MHz. A good example of the TZ amplifier 26 is the AU-1494-300 (model) manufactured by Miteq, or the like. The peak voltage outputted from the TZ amplifier 26 according to the above gain is about 0.25 V per photon.

The peak holding circuit 28 holds the peak value of the output signal from the TZ amplifier 26 for a fixed period of time and outputs this peak value. The peak value outputted from the peak holding circuit 28 is reset when a reset signal is received from the time signal output unit 14.

Upon receiving a trigger signal from the storage unit 16, the A/D converter 30 performs A/D (analog-to-digital) conversion on the signal outputted from the peak holding circuit 28 and outputs the converted signal. The resolution of the A/D converter 30 is adjusted to output the number of incident photons as a digital value. More specifically, the input range (0–1 V) is divided into 4 gradations, such that a digital value of "1" is outputted when the input voltage is 0.125–0.375 V, a digital value of "2" is outputted when the input voltage is 0.375–0.625 V, a digital value of "3" is outputted when the input voltage is 0.625–0.875 V, and a digital value of "4" is outputted when the input voltage is greater than or equal to 0.875 V. By adjusting the resolution in this way, a digital value of "1" is outputted from the A/D converter 30 when a single photon impinges on the HPD 24, a digital value of "2" is outputted when two photons impinge on the HPD 24, a digital value of "3" is outputted when three photons impinge on the HPD 24, and a digital value of "4" is outputted when four photons impinge on the HPD 24.

The time signal output unit 14 includes a timer 32 and a counter 34. The timer 32 generates and outputs a pulse signal at a fixed time interval (for example, 5 ns). The counter 34 receives the pulse signal from the timer 32 and outputs a reset signal (the reset signal A in FIG. 1) to the peak holding circuit 28 at the fixed time interval (for example, 5 ns). The counter 34 counts pulse signals received from the timer 32 and outputs the result of multiplying the period of pulse signals (for example, 5 ns) by the count number to the storage unit 16 as a time signal. The time interval of the pulse signals generated by the timer 32 should be as short as possible for improving precision because the time interval of the pulse signal determines the time resolution of the optical measurement apparatus 10, but should be longer than the time width of a response wave that the HPD 24 outputs in response to incidence of a single photon. This is because a single event will erroneously be counted multiple times if the time interval of the pulse signal were shorter than the response waveform for a single photon. The counter 34 is reset by a reset signal from the CPU 18 (the reset signal B) in FIG. 1 at the beginning of a measurement and the like.

The storage unit 16 includes a comparator 36, a delay circuit 37 for A/D conversion, and a memory 38. The output signal from the peak holding circuit 28 is inputted into the plus input terminal of the comparator 36, while a reference voltage is inputted into the minus input terminal. The reference voltage is set to 0.13 V, which is less than a voltage that is outputted from the peak holding circuit 28 (0.25 V) in response to incidence of one photon. The comparator 36 compares the output signal from the peak holding circuit 28 to the reference voltage and outputs a comparison result signal. In other words, if the output signal from the peak holding circuit 28 is larger than the reference voltage, then the output rises at the high level; and when the output signal from the peak holding circuit 28 is smaller than the reference voltage, the output drops to the low level. After being applied with a fixed amount of delay 1 by the delay circuit 37, the output from the comparator 36 is transmitted as a trigger signal to both of the A/D converter 30 and the memory 38. The value of the delay 1 applied by the delay circuit 37 is set to a value equivalent to or slightly greater than the time required for the output waveform of the TZ amplifier 26 to travel from 0 V to the peak voltage (FIG. 2(b)).

The memory 38 stores a time signal outputted from the counter 34 and the output signal outputted from the A/D converter 30 at the timing when a trigger signal is received from the delay circuit 37.

The operations of the storage unit 16 having the construction described above are as follows. Since a trigger signal is not outputted from the delay circuit 37 while photons do not impinge on the HPD 24, data is not stored in the memory 38.

However, when photons impinge on the HPD 24, the delay circuit 37 outputs a trigger signal to the A/D converter 30 and the memory 38. In this case, a digital value for the number of photons is outputted from the A/D converter 30 and stored in the memory 38, and a time signal outputted from the counter is also stored in the memory 38.

Next, the operations of the optical measurement apparatus according to the present embodiment will be described along with a method for optical measurement of the present embodiment. FIGS. 3(a)–3(h) are timing charts showing the operations of the optical measurement apparatus according to the present embodiment. It is noted that three photons impinge on the HPD 24 59 ns after the measurement start time (t=0), five photons impinge on the HPD 24 120 ns after the measurement start time, four photons impinge on the HPD 24 181 ns after the measurement start time, one photon impinges on the HPD 24 245 ns after the measurement start time, and two photons impinge on the HPD 24 282 ns after the measurement start time, as shown in FIG. 3(a).

At the start of the measurements, the CPU 18 outputs a reset signal to the counter 34 to reset the counter 34. After being reset, the counter 34 begins counting pulse signals received from the timer 32.

Since output from the HPD 24 and TZ amplifier 26 are small until photons are detected by the HPD 24, that is, from the measurement start time until 59 ns have elapsed, and the output from the peak holding circuit 28 does not exceed the reference voltage, the delay circuit 37 does not output a trigger signal and data is not stored in the memory 38.

However, when 3 photons impinge on the HPD 24 after 59 ns have elapsed from the measurement start time, photoelectrons are emitted from the photocathode 24a and multiplied by the APD 24b. The current outputted from the HPD 24 is converted to a voltage by the TZ amplifier 26. A waveform indicating the peak voltage of about 0.75 V, equivalent to 3 photons, is outputted, as shown in FIG. 3(b).

More specifically, the peak holding circuit 28 detects an output signal from the TZ amplifier 26, and this detection result is outputted to the A/D converter 30 and comparator 36 (FIG. 3(c)). When the output signal from the TZ amplifier 26 reaches a peak value, this peak value is saved for a prescribed interval by the peak holding circuit 28 and continuously outputted to the A/D converter 30 and comparator 36 (FIG. 3(c)).

When the output signal from the TZ amplifier 26 is greater than the reference voltage (0.13 V) inputted into the comparator 36, the output from the comparator 36 is set to high level. After the delay circuit 37 applies the prescribed delay 1, this high level output is outputted as a trigger signal to the A/D converter 30 and memory 38 (FIG. 3(d)) When a trigger signal is inputted into the A/D converter 30 from the delay circuit 37 in this way, the A/D converter 30 performs A/D conversion on the signal inputted from the peak holding circuit 28. The delay 1 is set equivalent to or slightly longer than the time required for the output waveform from the TZ amplifier 26 to travel from 0 V to the peak voltage. Accordingly, the peak value-of the output signal from the TZ amplifier 26 of about 0.75 V (equivalent to 3 photons) is inputted into the A/D converter 30 at the instant when a trigger signal is inputted into the A/D converter 30. Therefore, the digital value "3" is outputted from the A/D converter 30, as shown in FIG. 3(f).

Since the trigger signal is inputted also into the memory 38 from the delay circuit 37, the output value from the A/D converter 30 and the time signal outputted from the counter 34, as shown in FIG. 3(g), are stored in the memory 38. In other words, the value of a time signal, which is inputted from the counter 34 first after a trigger signal has been inputted into the memory 38, is stored in the memory 38.

It is noted that reset signals are outputted from the counter 34 to the peak holding circuit 28 repeatedly at the fixed time interval (for example 5 ns), as shown in FIG. 3(e). Accordingly, the output signal of the peak holding circuit 28 is reset repeatedly at the fixed time interval (for example, 5 ns), as shown in FIG. 3(c).

Similarly, when photons fall incident on the HPD 24, the number of incident photons and the time signal at the photon-incident time are stored in the memory 38. As a result, the data stored in the memory 38 is similar to that shown in FIG. 3(h).

As described above, the optical measurement apparatus 10 primarily includes the photon detection unit 12 for detecting incident photons, the time signal output unit 14 for outputting time signals, and the storage unit 16 for storing time signals that are outputted from the time signal output unit 14 when the photon detection unit 12 detects photons. The photon detection unit 12 includes the HPD 24 having the photocathode 24a and APD 24b, the TZ amplifier 26, the peak holding circuit 28, and the A/D converter 30. The time signal output unit 14 includes the timer 32 and counter 34. The storage unit 16 includes the comparator 36, delay circuit 37 for A/D conversion, and memory 38. When photons impinge on the HPD 24, the delay circuit 37 outputs a trigger signal, triggering the photon-number, outputted from the A/D converter 30, along with the time data outputted from the counter 34 to be stored in the memory 38.

Next, the operations and effects of the optical measurement apparatus according to the present embodiment will be described. By storing the number of photons detected by the HPD 24 and the time signal outputted from the counter 34 in the memory 38 when photons are detected, the optical measurement apparatus 10 of the present embodiment can measure when and how many photons have arrived. However, since no data is stored in the memory 38 when the HPD 24 does not detect photons, the amount of data stored therein is extremely small. Therefore, the capacity of the memory 38 can be used effectively, and the optical measurement apparatus 10 can measure, over a long period of time, when and how many photons have arrived.

Let us take a specific example of incident photons having a time series distribution as shown in FIG. 4(a). When using a digital oscilloscope to measure when and how many photons have arrived, data for 256 gradations (8 bits) of the output value is stored in memory every 1 ns along the time axis shown in FIG. 4(b). In contrast, when using the optical measurement apparatus 10 of the present embodiment, as shown in FIG. 4(c), only when photons impinge on the HPD 24, only the number of photons of a maximum of four gradations (2 bits) and the time data at that instant need be stored. In other words, by using the optical measurement apparatus 10 of the present embodiment with a 64-MB memory, it is possible to measure and record up to a maximum of 16 million events (incidence of photons), during the measuring time of 150 seconds, with the time resolution of 5 ns. By further employing the external memory 20, it is possible to measure and record for an even longer time.

Further, in the optical measurement apparatus 10 of the present embodiment, the A/D converter 30 outputs the number of incident photons as a digital value. Accordingly, signals outputted from the A/D converter 30 can be directly stored in the memory 38 and directly displayed on the display unit 22.

The optical measurement apparatus 10 according to the present embodiment employs the HPD 24 provided with the photocathode 24a and APD 24b, making it possible to efficiently detect the number of photons that impinge on the HPD 24 simultaneously (or at extremely close timings).

In the optical measurement apparatus 10 of the present embodiment, the HPD 24 is used as the photodetector. However, it is possible to use a VLPC (visual light photon counter) or the like, as well. The VLPC is formed of an arsenic-doped silicon substrate and a thin, non-doped epitaxial layer on the silicon substrate. Avalanche multiplication is generated by cooling the VLPC to about 7 K and applying about 7 V thereto, obtaining a gain of about $5 \times 10^4$. Such a high gain can be obtained using VLPC because the band gap can be considered as equivalent to the ionization energy produced from the impurity level. By obtaining such a high gain, the VLPC, like the HPD, can differentiate and output the number of incident photons.

The following variations are conceivable for the optical measurement apparatus 10 according to the present embodiment.

Figure 5:
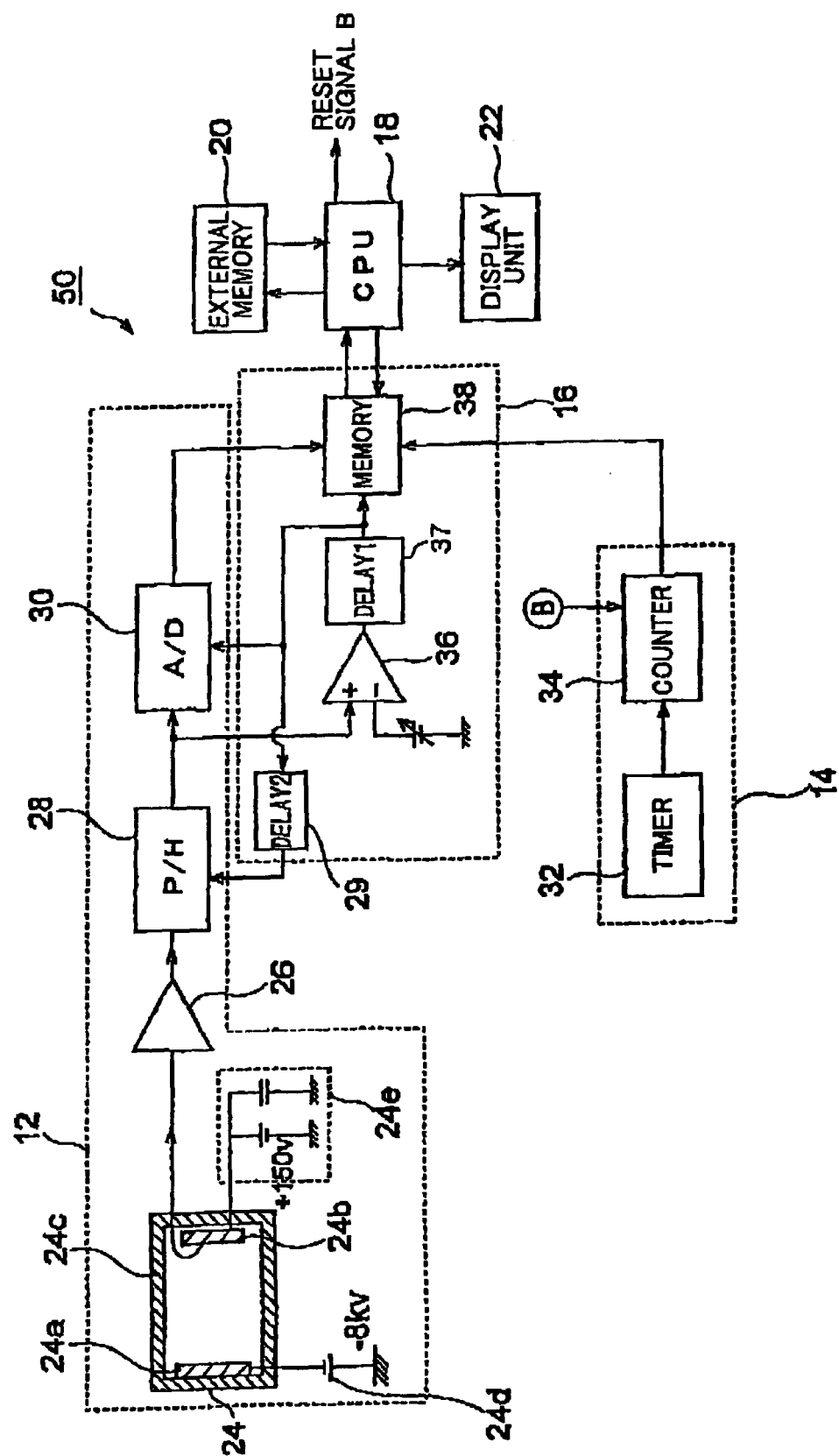
FIG. 5 shows the construction of an optical measurement apparatus according to a first variation of the preferred embodiment.

An optical measurement apparatus 50 according to a first variation will be described with reference to FIG. 5.

Rather than outputting a reset signal to the peak holding circuit 28 from the counter 34, the optical measurement apparatus 50 is provided with a delay circuit 29 for outputting a reset signal to the peak holding circuit 28. A trigger signal outputted from the delay circuit 37 is inputted into the delay circuit 29.

With this construction, when photons impinge on the HPD 24, the input voltage of the comparator 36 becomes larger than the reference voltage, causing a trigger signal to be outputted from the delay circuit 37. Upon receiving this trigger signal, the A/D converter 30 converts the output signal from the peak holding circuit 28 from analog to digital and outputs the converted result to the memory 38. The memory 38, having received the same trigger signal, stores the output signal from the A/D converter 30 and the time signal from the counter 34. Further, after being applied with a prescribed delay 2 by the delay circuit 29, the trigger signal is outputted to the peak holding circuit 28 as a reset signal. Accordingly, the peak holding circuit 28 is reset after a fixed time has elapsed since the trigger signal has been outputted from the delay circuit 37.

FIG. 6(a)–6(h) are timing charts showing the operations of the optical measurement apparatus 50. The point, at which the operations of the optical measurement apparatus 50 differ from those of the optical measurement apparatus 10 according to the embodiment described above, is that the peak holding circuit 28 is reset in response to a trigger signal generated by the delay circuit 37, that is, in response to incidence of photons. This reset signal is generated by delaying the trigger signal from the delay circuit 37 a fixed delay 2 with the delay circuit 29. Accordingly, the peak holding circuit 28 is reset after the A/D converter 30 performs A/D conversion. With this construction, even when a plurality of photons impinge sequentially within a period that is equal to the reset interval set in the optical measurement apparatus 10 in the embodiment described above, the optical measurement apparatus 50 can record the number of photons at each photon-incident event and the time of each photon-incident event.

Figure 7:
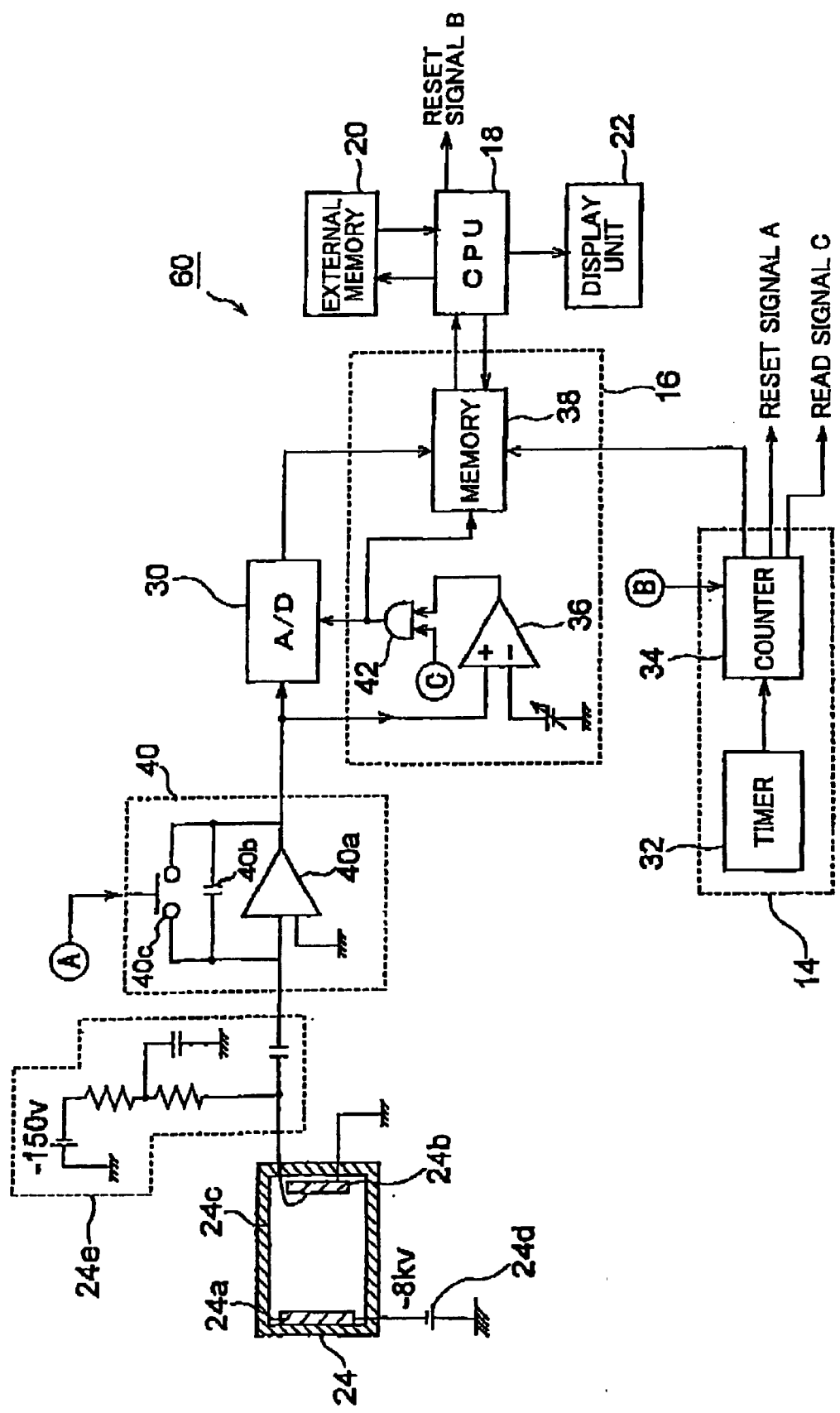
FIG. 7 shows the construction of an optical measurement apparatus according to a second variation of the preferred embodiment.
Figure 8:
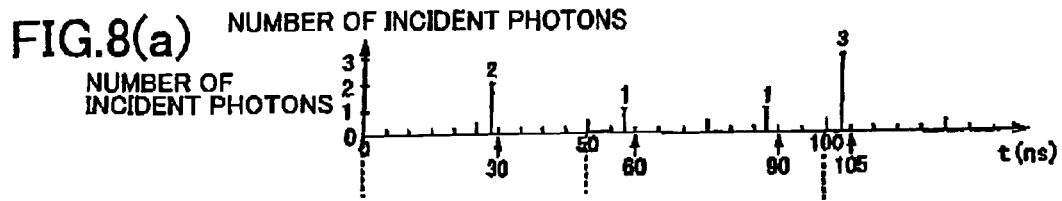

FIG. 7 shows the construction of an optical measurement apparatus 60 according to a second variation of the preferred embodiment. In the optical measurement apparatus 10 of the preferred embodiment described above, the current signal outputted from the HPD 24 is converted to a voltage by the TZ amplifier 26, and the peak holding circuit 28 outputs an output signal that is resulted by holding the peak value for the fixed time period. However, these functions can be achieved by a charge amplifier 40 with reset function, as in the optical measurement apparatus 60 of the present variation. The charge amplifier 40 includes an operational amplifier 40a, a capacitor 40b, and a reset switch 40c. A first input terminal of the operational amplifier 40a is grounded, and the output current from the HPD 24 is inputted into a second input terminal. The output terminal of the operational amplifier 40a is connected to the input terminal of the A/D converter 30 and the plus input terminal of the comparator 36. The capacitor 40b is connected to the second input terminal of the operational amplifier 40a and the output terminal of the operational amplifier 40a. The reset switch 40c is connected in parallel with the capacitor 40b. The charge amplifier 40 integrates the electrical charge outputted from the HPD 24 and outputs the voltage resulting from the integration, and is reset when the reset switch 40c is turned ON by a reset signal outputted from the counter 34 (reset signal A in FIG. 7).

The comparator 36 compares the output voltage from the charge amplifier 40 to a reference voltage and switches its logical output to the high level when the output voltage is greater than the reference voltage and to the low level when the output level is smaller than the reference voltage. The high level logic output is outputted as a trigger signal.

FIGS. 8(a)–8(h) are timing charts. The counter 34 in the time signal output unit 14 of the optical measurement apparatus 60 outputs a read signal (read signal C in FIG. 7) just prior to outputting a reset signal (FIGS. 8(b) and 8(c)).

An AND circuit 42 is provided downstream from the comparator 36 in the storage unit 16. The read signal outputted from the counter 34 and the trigger signal outputted from the comparator 36 (FIG. 8(e)) are inputted into the AND circuit 42. The AND circuit 42 outputs an output signal to the A/D converter 30 and the memory 38. Accordingly, the A/D converter 30 performs A/D conversion at the instant when the read signal is outputted from the counter 34 after the output voltage from the charge amplifier 40 (FIG. 8(d)) exceeds the reference voltage. The output signal from the A/D converter 30 is stored along with the time signal from the counter 34 in the memory 38. This construction eliminates the need for providing the peak holding circuit 28 and the delay circuit 37 of the embodiment described above. Further, the optical measurement apparatus 60 can minimize errors when a plurality of photons are continuously impinged within a short time.

Figure 9:
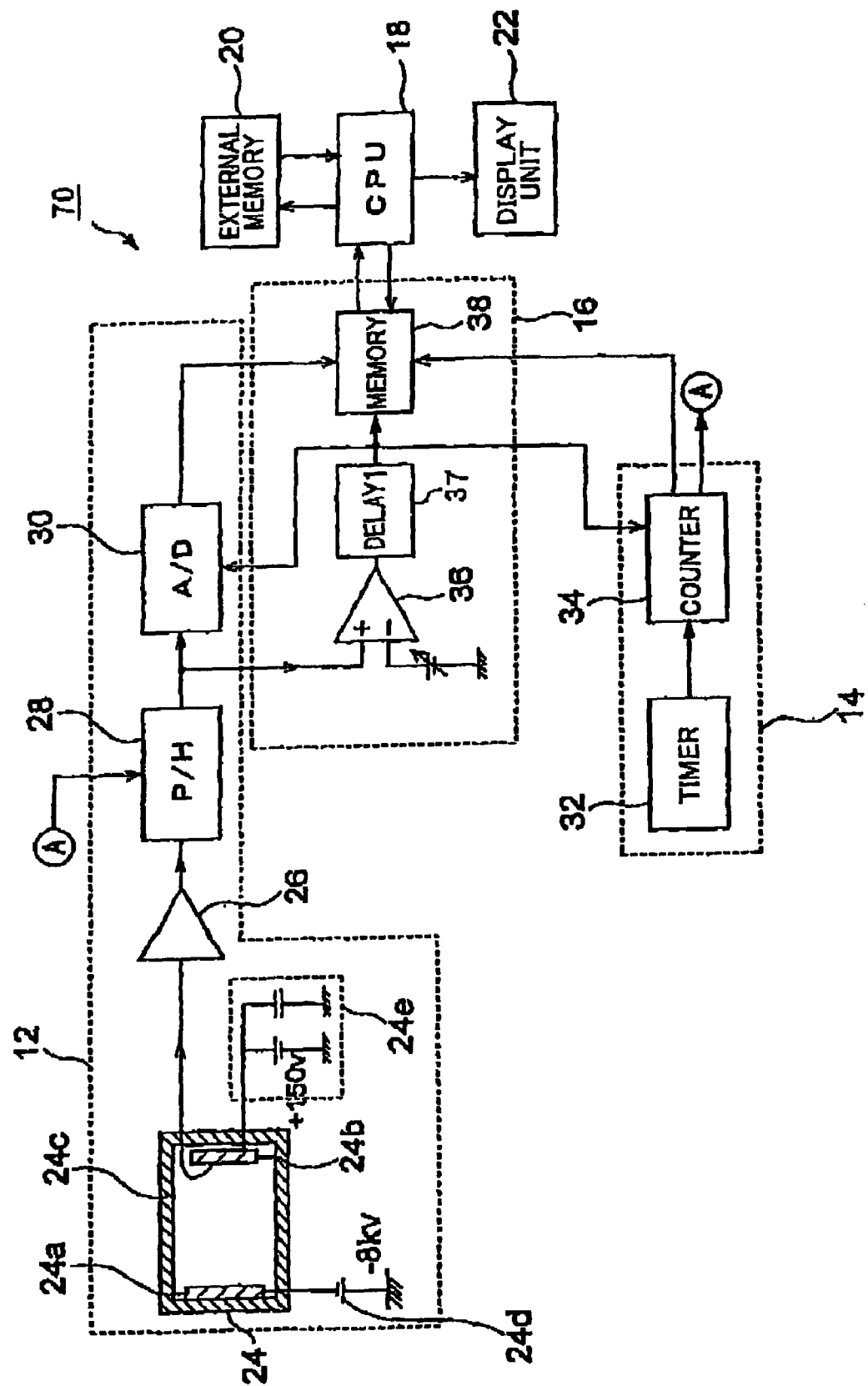
FIG. 9 shows the construction of an optical measurement apparatus according to a third variation of the preferred embodiment.

In the optical measurement apparatus 10 of the embodiment described above, the counter 34 is reset by a reset signal outputted from the CPU 18 at the beginning of a measurement. However, the counter 34 can be reset by the trigger signal from the delay circuit 37, as in an optical measurement apparatus 70 according to a third variation shown in FIG. 9. With this construction, by resetting the counter 34 in time with the incidence of photons, the time signal outputted from the counter 34 indicates the time interval at which photons fall incident on the HPD 24 successively. Accordingly, the number of photons falling incident on the HPD 24 and the time interval at which the photons fall incident on the HPD 24 are stored in the memory 38.

Further, while the optical measurement apparatus 10 according to the embodiment described above employs the APD 24b as the semiconductor photodetector, a photodiode or the like can also be used.

The optical measurement apparatus and method for optical measurement of the present invention are not limited to the embodiments described above. Many modifications and variations may be made therein.

For example, a time signal, which is inputted from the counter 34 at the first time after the trigger signal has been inputted into the memory 38, is stored in the memory 38 in the optical measurement apparatus and method for optical measurement of the preferred embodiment. However, it is also possible to store in the memory 38 the last time signal that has been inputted from the counter 34 prior to the time when the trigger signal is inputted into the memory 38.

INDUSTRIAL APPLICABILITY

The optical measurement apparatus and method for optical measurement according to the present invention are widely used in the detection of bioluminescence.

What is claimed is:

1. An optical measurement apparatus, comprising:
a photon detecting portion detecting incident photons;
a time signal outputting portion outputting time signals; and
a storing portion storing a time signal that is outputted from the time signal outputting portion at the time when the photon detecting portion detects photons;
wherein the photon detecting portion includes:
a photodetector outputting an output signal in response to incidence of photons; and
a peak holding circuit detecting the output signal supplied from the photodetector and holding a peak thereof;
wherein the storing portion includes:
a comparing portion comparing the output signal detected by the peak holding circuit with a predetermined threshold value and outputting a trigger signal when a predetermined delay time has elapsed after the output signal has become larger than the threshold value; and
a storage controlling portion storing the time signal upon receipt of the trigger signal.

2. An optical measurement apparatus as claimed in claim 1, wherein the photodetector detects the number of incident photons and outputs an output signal that corresponds to the number of incident photons,
wherein the peak holding circuit detects the output signal supplied from the photodetector and holds the peak thereof,
wherein the storage controlling portion stores the time signal and a value of the peak held in the peak holding circuit upon receipt of the trigger signal.

3. An optical measurement apparatus as claimed in claim 2, wherein the photon detecting portion further includes an analog-to-digital converter converting the value of the peak held in the peak holding circuit from analog to digital,
wherein the storage controlling portion controls, in response to the trigger signal, the analog-to-digital converter to convert the value of the peak held in the peak holding circuit from analog to digital, thereby outputting the number of incident photons in a digital value.

4. An optical measurement apparatus as claimed in claim 2, wherein the photon detecting portion includes:
a photocathode emitting photoelectrons that correspond to the number of the incident photons;
an accelerating portion accelerating the photoelectrons emitted from the photocathode; and
a semiconductor photodetector receiving the photoelectrons accelerated by the accelerating portion and outputting an output signal that corresponds to the number of the photoelectrons.

5. An optical measurement apparatus as claimed in claim 4, wherein the semiconductor photodetector includes an avalanche photodiode.

6. An optical measurement apparatus as claimed in claim 2, wherein it takes a predetermined period of time for the output signal outputted from the photodetector to reach its peak regardless of the number of the incident photons, the length of the predetermined delay time being longer than or equal to the predetermined period of time.

7. An optical measurement apparatus as claimed in claim 6, wherein the photodetector includes:
a photoelectric conversion portion outputting an electric current that corresponds to the number of incident photons; and
a current-to-voltage converting portion amplifying the electric current signal to convert the electric current signal into an electric voltage signal, thereby outputting the output signal;
wherein the current-to-voltage converting portion outputs the output signal in such an output wave form that it takes the predetermined period of time for the output signal to reach its maximum voltage value regardless of the magnitude of the inputted electric current signal.

8. An optical measurement apparatus comprising:
a photon detecting portion detecting incident photons and outputting an output signal indicative of the detected result;
a time signal outputting portion repeatedly outputting a time signal at a predetermined time interval, the time signal indicating a timing when the subject time signal is outputted from the time signal outputting portion; and
a memory;
a comparing portion comparing the output signal with a predetermined threshold value and outputting a trigger signal when the output signal is larger than the threshold value; and
a storage controlling portion storing the time signal in the memory upon receipt of the trigger signal that is outputted when the output signal is larger than the threshold value, thereby storing in the memory the time signal indicative of the time when the photon detecting portion detects photons.

9. An optical measurement apparatus as claimed in claim 8,
wherein the photon detecting portion includes:
a photocathode emitting photoelectrons that correspond to the number of the incident photons;
an accelerating portion accelerating the photoelectrons emitted from the photocathode; and
a semiconductor photodetector receiving the photoelectrons accelerated by the accelerating portion and outputting an output signal that corresponds to the number of the photoelectrons.

10. An optical measurement apparatus as claimed in claim 9,
wherein the semiconductor photodetector includes an avalanche photodiode.

11. An optical measurement apparatus comprising:
a detection signal outputting portion detecting incident photons and outputting a detection signal indicative of the number of the detected photons;

a comparing portion comparing the detection signal to a predetermined threshold value and outputting a trigger signal when the detection signal is larger than the threshold value;

an analog-to-digital converter converting the detection signal into a digital value upon receipt of the trigger signal, the digital value indicating the number of photons detected by the detection signal outputting portion;

a time signal outputting portion repeatedly outputting a time signal at a predetermined time interval, the time signal indicating a timing when the subject time signal is outputted from the time signal outputting portion;

a memory; and a storage controlling portion storing the digital value and the time signal in the memory in response to the trigger signal that is outputted when the output signal is larger than the threshold value, thereby storing in the memory the time signal indicative of the time when the detection signal outputting portion detects the photons, and the digital value stored in the memory indicating the number of photons detected by the detection signal outputting portion.

12. An optical measurement apparatus as claimed in claim 1,
wherein the detection signal outputting portion includes:
a photodetector outputting an output signal that corresponds to the number of incident photons, and
an output signal detector repeatedly performing a detection operation for detecting the output signal for a predetermined time period,
wherein the comparing portion compares a detection result of the detecting operation performed by the output signal detector to the predetermined threshold value, the comparing portion outputting a trigger signal when the detection result is larger than the threshold value.

13. An optical measurement apparatus as claimed in claim 12, wherein the photodetector includes:
a photocathode emitting photoelectrons that correspond to the number of the incident photons;
an accelerating portion accelerating the photoelectrons emitted from the photocathode; and
a semiconductor photodetector receiving the photoelectrons accelerated by the accelerating portion and outputting an output signal that corresponds to the number of the photoelectrons.

14. An optical measurement apparatus as claimed in claim 13, wherein the semiconductor photodetector includes an avalanche photodiode.

15. An optical measurement apparatus comprising:
a photon detecting portion detecting the number of incident photons;
a time signal outputting portion repeatedly outputting a time signal at a predetermined time interval; and
a storing portion storing, when the photon detecting portion detects photons, the number of the photons detected by the photon detecting portion and a time signal that is outputted from the time signal outputting portion at the time when the photon detecting portion detects photons;
wherein the photon detection portion includes:
a photodetector outputting an output signal that corresponds to the number of incident photons;
a peak holding circuit repeatedly performing a detection operation for detecting the output signal supplied from the photodetector for a predetermined period of time and for holding a peak thereof; and an analog-to-digital converter converting the value of the peak held in the peak holding circuit from analog to digital, thereby outputting the number of the incident photons as a digital value;
wherein the storing portion includes:
a comparing portion comparing the output signal detected by the peak holding circuit with a predetermined threshold value and outputting a trigger signal when a predetermined delay time has elapsed after the output signal has become larger than the threshold value, the analog-to-digital converter converting, in response to the trigger signal, the value of the peak held in the peak holding circuit from analog to digital; and
wherein the storing portion further includes a storage controlling portion storing the digital value and the time signal in response to the trigger signal.

16. An optical measurement apparatus as claimed in claim 15, wherein the time signal outputting portion repeatedly outputs a reset signal to the peak holding circuit at a predetermined time interval, thereby causing the peak holding circuit to be reset in response to the reset signal.

17. An optical measurement apparatus as claimed in claim 15, wherein the comparing portion resets the peak holding circuit by outputting a reset signal to the peak holding circuit when a predetermined time has elapsed after the comparing portion outputs the trigger signal.

18. An optical measurement apparatus comprising:
a photon detecting portion detecting the number of incident photons,
a time signal outputting portion repeatedly outputting a time signal at a predetermined time interval, and
a storing portion storing, when the photon detecting portion detects photons, the number of the photons detected by the photon detecting portion and a time signal that is outputted from the time signal outputting portion at the time when the photon detecting portion detects photons,
wherein the photon detection portion includes:
a photodetector that outputs an electric current signal that corresponds to the number of the incident photons, and
an integrating portion repeatedly executing a detection operation for converting the electric current signal to an electric voltage signal by integrating the electric current signal for a predetermined period of time,
an analog-to-digital converter converting the value of the electric voltage signal outputted from the integrating portion from analog to digital, thereby outputting the number of the incident photons as a digital value,
wherein the time signal outputting portion repeatedly outputs a pair of read signal and a reset signal at a predetermined interval, the time signal outputting portion outputting each pair of a read signal and a reset signal by outputting the read signal and the reset signal in this order,
wherein the integrating portion is reset in response to the reset signal,
wherein the storing portion includes a comparing portion that compares the voltage signal, supplied from the integrating portion, to a predetermined threshold value and that outputs a trigger signal if the voltage signal is larger than the threshold value at the time when the comparing portion receives the read signal, the analog-to-digital converter converting, in response to the trigger signal, the value of the voltage signal, supplied from the integrating portion, from analog to digital, and wherein the storing portion further includes a storage controlling portion storing the digital value and the time signal in response to the trigger signal.

19. An optical measurement method, comprising:

a photon detecting step detecting incident photons;

a time signal outputting step outputting time signals; and a storing step storing a time signal that is outputted from the time signal outputting step at the time when the photon detecting step detects photons;

wherein the photon detecting step includes:

a photodetecting step outputting an output signal in response to incidence of photons; and a peak holding step detecting the output signal supplied from the photodetecting step and holding a peak thereof;

wherein the storing step includes:

a comparing step comparing the output signal detected by the peak holding step with a predetermined threshold value and outputting a trigger signal when a predetermined delay time has elapsed after the output signal has become larger than the threshold value; and a storage controlling step storing the time signal upon receipt of the trigger signal.

20. An optical measurement method as claimed in claim 19, wherein the photodetecting step detects a plurality of incident photons in separation from one another, and outputs an output signal that corresponds to the number of the incident photons, wherein the peak holding step detects the output signal supplied from the photodetecting step and holds the peak thereof, wherein the storage controlling step stores the time signal and a value of the peak held by the peak holding step upon receipt of the trigger signal.

* * * * *